United States Patent [19]

Saj

[11] Patent Number: 4,932,085

[45] Date of Patent: Jun. 12, 1990

[54] ABOVE GROUND SWIMMING POOL WITH IMPROVED RIB STRUCTURE AND MODULAR DECK PANELS FOR SOLAR HEATING OF POOL WATER

[75] Inventor: Kenneth S. Saj, Lancaster, N.Y.

[73] Assignee: Allmark Industries, Inc., Buffalo, N.Y.

[21] Appl. No.: 628,758

[22] Filed: Jul. 9, 1984

[51] Int. Cl.$^5$ .............................................. E04H 3/18
[52] U.S. Cl. ........................................ 4/493; 4/506; 126/416
[58] Field of Search ........................... 4/488, 493–494, 4/506–507, 509; 126/416, 415, 444, 445, 271.2 A

[56] References Cited

U.S. PATENT DOCUMENTS

| 3,444,659 | 5/1969 | Shanni ................................. 4/506 |
| 3,447,168 | 6/1969 | Gabrielli et al. . |
| 3,686,694 | 8/1972 | Gerring . |
| 3,720,964 | 3/1973 | Thomson . |
| 3,840,908 | 10/1974 | Greene . |
| 3,868,797 | 3/1975 | Fox et al. ............................. 52/73 |
| 3,945,059 | 3/1976 | Allocco, Jr. . |
| 4,085,728 | 4/1978 | Tomchak ........................... 136/445 |
| 4,132,074 | 1/1979 | Wendel ............................... 60/641 |
| 4,205,499 | 6/1980 | Lankheet ............................ 52/169 |
| 4,211,213 | 7/1980 | Nissen ................................ 126/452 |
| 4,237,860 | 12/1980 | Caroon ............................... 126/415 |
| 4,280,477 | 7/1981 | Divine ................................ 126/416 |
| 4,312,323 | 1/1982 | Domenech ......................... 126/415 |
| 4,315,497 | 2/1982 | Vardey ............................... 126/416 |
| 4,333,186 | 6/1982 | Lankheet ............................. 4/506 |
| 4,381,763 | 5/1983 | Kahl .................................... 126/416 |
| 4,474,168 | 10/1984 | Pettit .................................. 126/416 |

FOREIGN PATENT DOCUMENTS

| 1120807 | 3/1982 | Canada ............................... 126/415 |
| 1328372 | 8/1973 | United Kingdom . |
| 2031141 | 4/1980 | United Kingdom ............... 126/415 |

Primary Examiner—Linda J. Sholl
Attorney, Agent, or Firm—Joseph P. Gastel

[57] ABSTRACT

An above ground swimming pool rib structure including a lower plastic section, an upper plastic section, aligned tubular portions in the upper and lower sections, a wooden keying member joining the upper and lower sections, a second tubular portion in the lower section for receiving a wooden post for supporting the side of the water tank of the swimming pool, and third tubular portions with interspersed webs extending transversely to all of the foregoing tubular portions for rigidizing the rib structure, the wooden keying member receiving nails which extend through the tubular portion of the upper section for attaching fence members and a hand rail. A plastic solar deck panel for a swimming pool including a body, a plurality of elongated compartments on the body, adjacent side walls on adjacent compartments, conduits coupling the compartments in series in a serpentine orientation, water inlet and outlet conduits in the body, and spaces between the side walls of adjacent compartments to cause the compartments to give the appearance of side-by-side slats.

63 Claims, 7 Drawing Sheets

ABOVE GROUND SWIMMING POOL WITH IMPROVED RIB STRUCTURE AND MODULAR DECK PANELS FOR SOLAR HEATING OF POOL WATER

BACKGROUND OF THE INVENTION

The present invention relates to an improved above ground swimming pool construction and more particularly to an improved rib structure and to an improved deck structure therefor.

By way of background, the present invention is an improvement over the swimming pool construction disclosed in U.S. Pat. No. 3,686,694. Since the ribs and the deck of the swimming pool shown in the foregoing patent were made of wood, it was necessary to periodically paint the wood. In addition, slivers could be received from the wood. It is with overcoming deficiencies that the present invention is concerned.

SUMMARY OF THE INVENTION

It is one important object of the present invention to provide a plastic rib structure for an above ground swimming pool which is not subject to decay and which does not require periodic maintenance, such as painting.

Another object of the present invention is to provide an improved plastic pool deck structure which is not subject to deterioration and which does not require periodic painting and which is constructed in such a manner so as to function as a panel through which pool water is conducted in a serpentine path for solar heating and which gives the appearance of parallel wood slats resembling a wooden pool deck. Other objects and attendant advantages of the present invention will readily be perceived hereafter.

The present invention relates to a rib for a swimming pool comprising a lower plastic section, a first inner side on said lower plastic section, a first outer side on said lower plastic section, a first central body portion between said first inner and outer sides, an upper plastic section, a second inner side on said upper plastic section, a second outer side on said upper plastic section, a second central body portion between said second inner and outer sides, a first tubular portion at said first inner side for receiving a post, a second tubular portion at said first outer side, a third tubular portion at said second inner side, and an elongated keying member having a lower end portion in said second tubular portion and having an upper end portion in said third tubular portion for holding said lower and upper plastic sections in assembled relationship.

The present invention also relates to a plastic solar deck panel for a swimming pool comprising a body, a plurality of elongated compartments on said body, adjacent side walls on adjacent compartments, conduit means coupling said compartments in series in a serpentine orientation, water inlet and outlet conduit means in said body for passing water into and out of said panel, and spaces between side walls of adjacent compartments to cause the compartments to give the appearance of side-by-side slats.

The various aspects of the present invention will be more fully understood when the following portions of the specification are read in conjunction with the accompanying drawings wherein:

DESCRIPTION OF THE PREFERRED EMBODIMENTS

Summarizing briefly in advance, the basic construction of the above ground swimming pool 10 is basically the same as disclosed in U.S. Pat. No. 3,686,694, which is incorporated herein by reference, except that the present invention relates to an improved rib structure which is fabricated of plastic and it also relates to a plastic solar deck construction through which pool water is pumped and is heated by the sun.

Figures 8, 11, 13, 14:
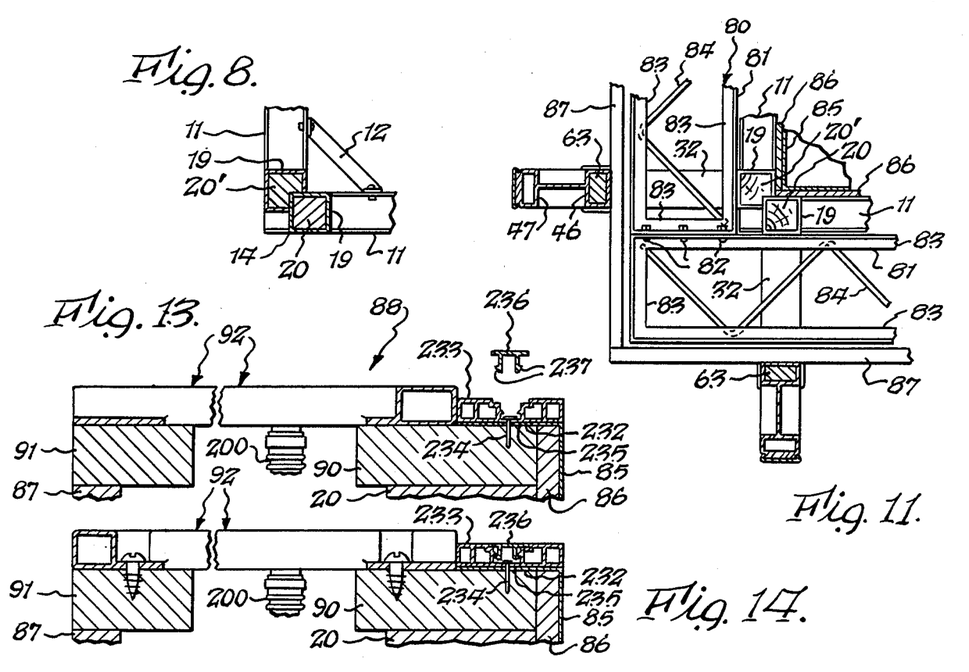
FIG. 8 is a fragmentary cross sectional view taken substantially along line 8—8 of FIG. 3 at the corner of a pool and showing the manner in which the corner ribs are oriented relative to each other and how they fit into the bottom channel frame members.
FIG. 11 is a fragmentary cross sectional view taken substantially along line 11—11 of FIG. 3 showing the manner in which the upper frame members are joined relative to each other and their orientation relative to the ribs at the corners of the pool.
FIG. 13 is a fragmentary cross sectional view taken substantially along line 13—13 of FIG. 12 and showing portions of the solar deck and the pool structure.
FIG. 14 is a fragmentary cross sectional view taken along line 14—14 of FIG. 12.

The swimming pool 10 of the present invention includes a rectangular framework of lower channels 11 (FIGS. 1, 8, 9 and 10) placed on the ground with their open sides extending upwardly for defining the outer periphery of the lower portion of the pool. The channels 11 on each side of the pool are joined to each other at their corners by metal braces 12 which are bolted between adjacent channels (FIG. 8). The corners of adjacent channels may also be bolted at their juncture with bolts, not shown. Channels 11 receive ribs 13 at spaced locations around the four sides of the pool. Holes 15' may be provided in the channels 11 (FIG. 2) to aid in spacing ribs 13, and nails 14' may be driven through holes 15' to secure the ribs to the channels.

Figures 2, 2A:
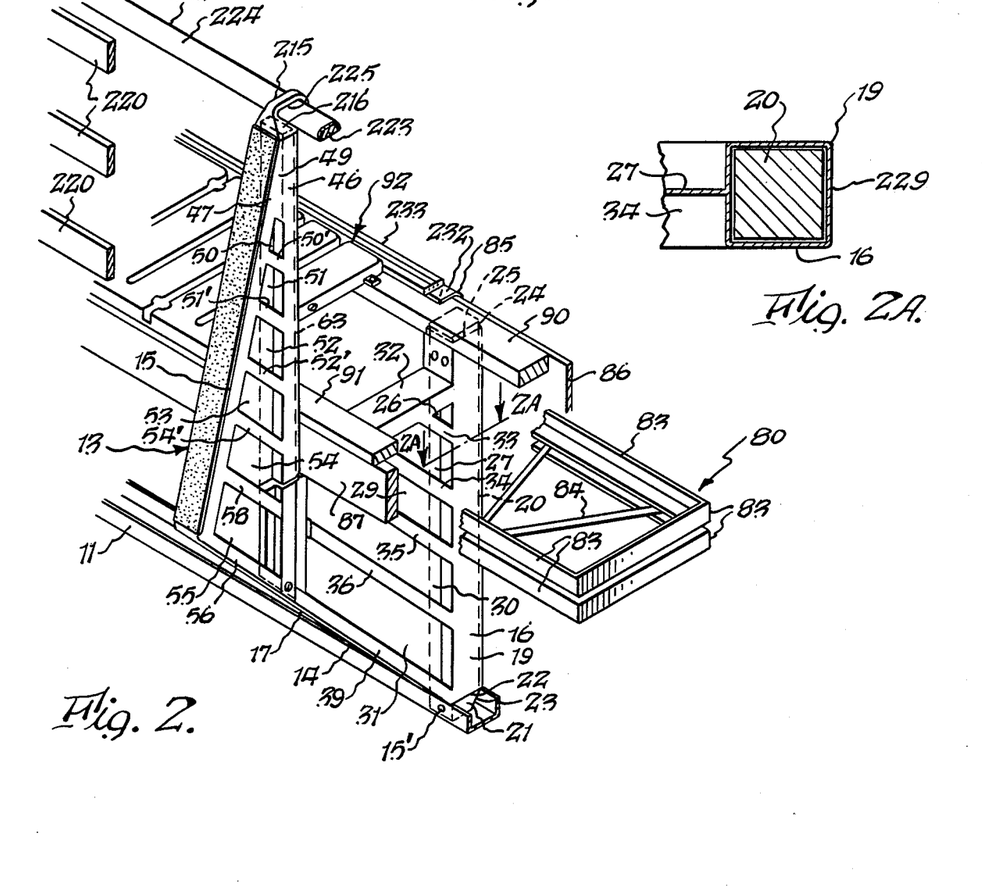
FIG. 2 is a fragmentary perspective view of the rib structure and showing its relationship to certain other components of the pool.
FIG. 2A is a fragmentary cross sectional view taken substantially along line 2A—2A of FIG. 2.
Figures 3, 4, 5, 6, 7:
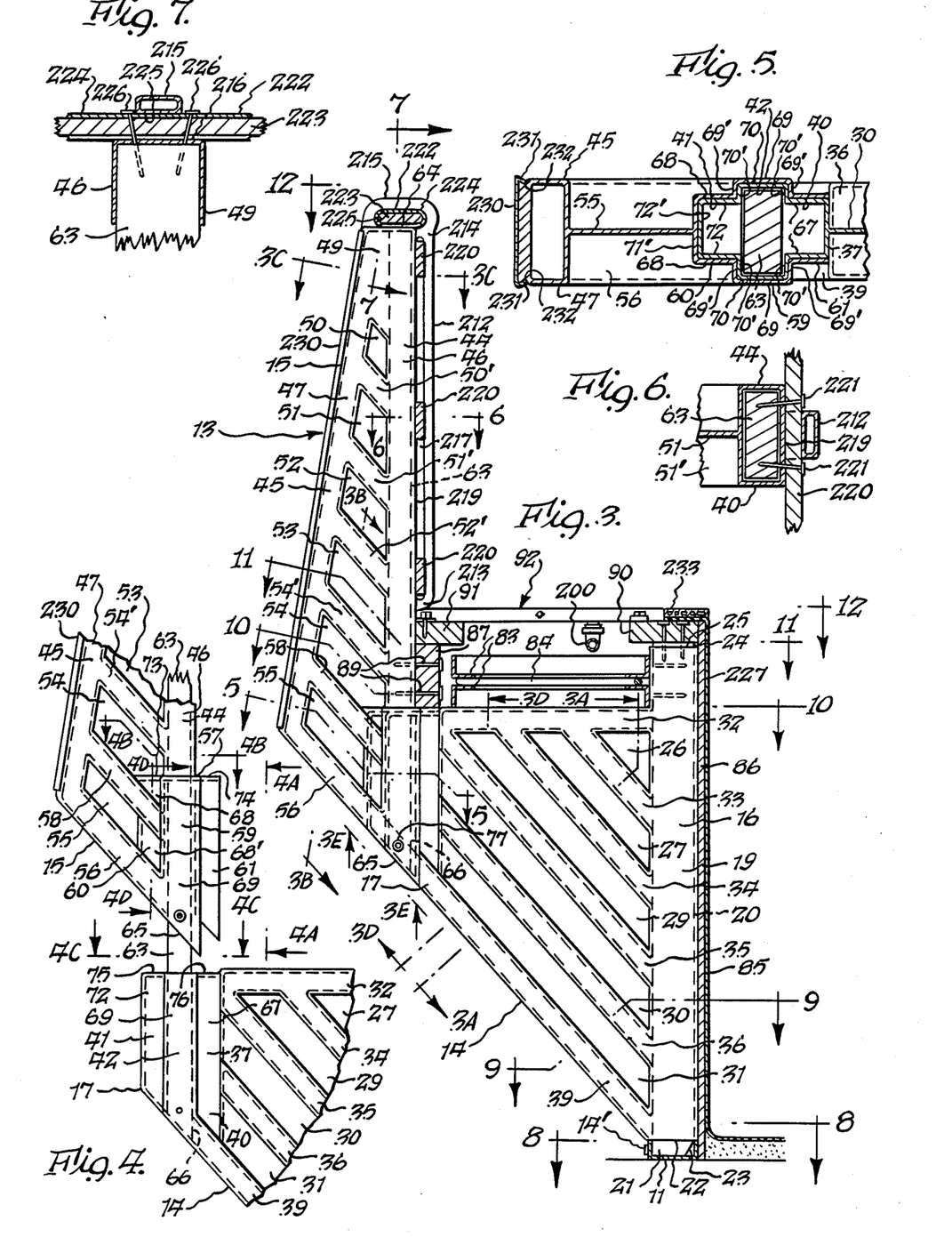
FIG. 3 is a side elevational view of the rib structure taken substantially along line 3—3 of FIG. 1 and also showing in cross section other portions of the pool.
FIG. 4 is a fragmentary side elevational view similar to FIG. 3 and showing the upper and lower plastic rib sections in the process of being assembled.
FIG. 5 is a fragmentary cross sectional view taken substantially along line 5—5 of FIG. 3 and showing the upper and lower rib sections in assembled relationship.
FIG. 6 is a fragmentary cross sectional view taken substantially along line 6—6 of FIG. 3 and showing the relationship between the upper rib section and the rail of a fence.
FIG. 7 is a fragmentary cross sectional view taken substantially along line 7—7 of FIG. 3 and showing the manner in which the hand rail is associated with the upper rib section.

Each rib 13 is fabricated from a combination of blow-molded high density polyethylene plastic and wood and comprises a lower section 14 and an upper section 15 (FIG. 4) which are suitably joined to each other. Lower section 14 comprises an inner side portion 16 and an outer side portion 17 (FIGS. 3 and 4). The inner side portion 16 includes a tubular portion 19 which receives a 4×4 wood post 20 (FIGS. 2, 3 and 2A) which protrudes at 21 beyond the lower edge 22 of tubular portion 19 and is received in channel 11. Post 20 is suitably treated against decay. The end 21 of post 20 is chamfered at 23 so that it can be received in channel 11 which is narrower than the corresponding dimension of the 4×4 post 20. Post 20 also protrudes slightly at 24 beyond the upper edge 25 of tubular portion 16.

Figures 3A, 3B, 3C, 3D, 3E, 4A, 4B, 4C, 4D:
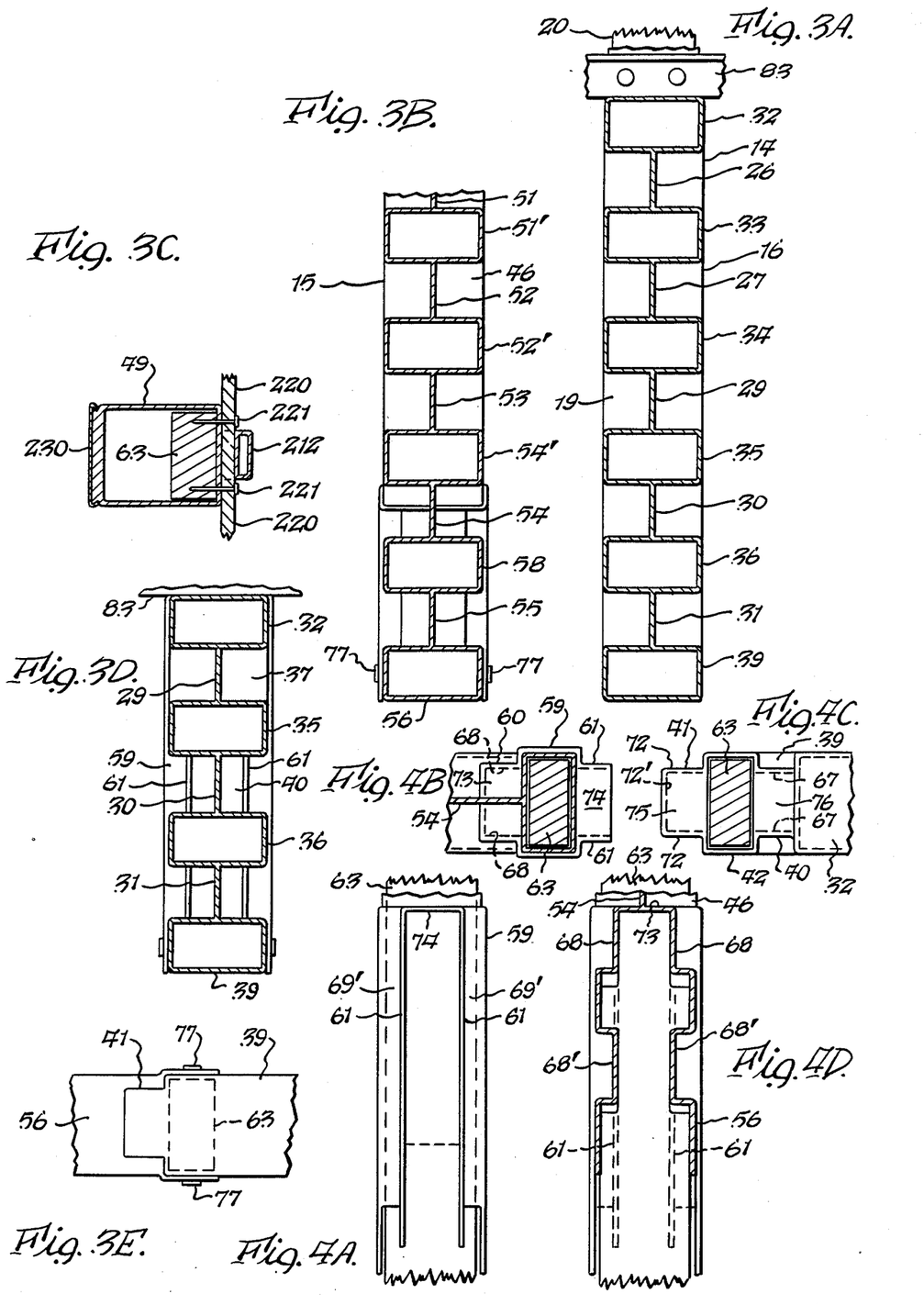
FIG. 3A is a fragmentary cross sectional view taken substantially along line 3A—3A of FIG. 3 and showing the structure of the lower rib section.
FIG. 3B is a fragmentary cross sectional view taken substantially along line 3B—3B of FIG. 3 and showing the construction of the upper rib section.
FIG. 3C is a cross sectional view taken substantially along line 3C—3C of FIG. 3 and showing the construction of the upper rib section in this area.
FIG. 3D is a cross sectional view taken substantially along line 3D—3D of FIG. 3.
FIG. 3E is a fragmentary view taken substantially in the direction of arrows 3E—3E of FIG. 3.
FIG. 4A is a fragmentary side elevational view taken substantially in the direction of arrows 4A—4A of FIG. 4.
FIG. 4B is a fragmentary cross sectional view taken subtantially along line 4B—4B of FIG. 4.
FIG. 4C is a fragmentary cross sectional view taken substantially along line 4C—4C of FIG. 4.
FIG. 4D is a fragmentary cross sectional view taken along line 4D—4D of FIG. 4.

Tubular portion 19 is molded integrally with webs 26, 27, 29, 30 and 31 (FIGS. 3 and 3A). The ends of webs 26, 27 and 29 remote from tubular portion 19 are molded integrally with upper horizontal tubular portion 32 (FIG. 3). Web 26 is molded integrally with and extends between tubular portions 19, 32 and 33. Web 27 is molded integrally with and extends between tubular portions 19, 32, 33 and 34. Web 29 is molded integrally with and extends between tubular portions 19, 32, 34 and 35 (FIGS. 3 and 3D). Web 30 extends between and is molded integrally with tubular portions 19, 35, 36 and 37 (FIGS. 3, 3D, 4 and 5). Web 31 extends between and is molded integrally with tubular portions 19, 36, 37 and 39. Tubular portion 37 includes a reduced end portion 40, a reduced end portion 41, and an enlarged central portion 42 therebetween (FIGS. 4, 4C and 5). The thickness of the webs is approximately ¼ inches and the thickness of the walls of the tubular portions is approximately 3/16 inches, and the the upper rib section 15 is also a blow molded high density polyethylene plastic section which is secured to the lower rib section 14. The upper rib section 15 includes an inner side portion 44 and an outer side portion 45. A tubular portion 46 (FIGS. 3, 4 and 4B) is located at the inner side portion 44 and a tubular portion 47 (FIGS. 3, 4 and 5) is located at the outer side portion 45. Tubular portions 46 and 47 merge at the upper end to provide a singular tubular portion 49 (FIGS. 3 and 3C). A plurality of webs 50, 51, 52, 53, 54 and 55 extend between tubular portions 46 and 47 (FIGS. 3, 3B and 4). A plurality of tubular sections 50', 51', 52', 54' and 58 (FIGS. 2, 3 and 3B) extend between tubular portions 46 and 47. A tubular section 56 joins tubular sections 46 and 47 at their bottoms. The lower portion of tubular portion 46 at 57 has the configuration shown in FIGS. 4, 4A, 4B and 5 and it includes an enlarged central portion 59 which merges into smaller portion 60. Flanges 61 are formed on the opposite side of central portion 59 from portion 60.

Upper rib section 15 is assembled onto lower rib section 14 in the following manner. A 2×4 wooden keying member 63 is inserted into tubular portion 46 of upper section 15 (FIGS. 3, 3C, 4, 4B, 5 and 6). Keying member 63 extends from the top portion 64 to the lower edge 65 of tubular portion 46 when upper section 15 is assembled with lower section 14. The lower portion 66 of keying member 63 is received in the enlarged central portion 42 of tubular portion 37 of lower rib section 14 (FIGS. 4, 4C and 5). The lower tubular section 57 of upper rib section 15 receives the upper tubular section 37 of lower rib section 14 in complementary mating relationship (FIGS. 3, 4 and 5). More specifically, flanges 61 fit against side walls 67 of tubular section 37 (FIG. 5). Side walls 69 of enlarged central tubular portion 59 of upper section 15 fit against side walls 70 of tubular portion 42. Side walls 68 and 68' (FIGS. 4 and 4D) of tubular portion 60 fit against side walls 72 of tubular portion 41 of lower section 14. Side wall 71' fits against side wall 72', and side walls 69' fit against side walls 70'. Tubular portion 60 terminates at a top wall 73 (FIG. 4B), and flanges 61 terminate at a top wall 74 (FIGS. 4A and 4B). Tubular portion 41 terminates at a top wall 75 (FIGS. 4 and 4C) and tubular portion 40 terminates at a top wall 76. When upper section 15 is assembled onto lower section 14, top walls 73 and 74 will rest on top walls 75 and 76, respectively, to thereby define the limit of movement of upper section 15 onto lower section 14. Screws 77 are installed through the tubular portions 42 and 59 and into 2×4 member 63 and lock the upper section 15 and the lower section 14 to member 63.

The use of the keying member 63 in conjunction with the telescopic connection between the lower portion of the upper section 15 and the upper portion of the lower section 15 produces an extremely rigid assembly of the rib 13. Furthermore, the combination of the tubular portions and the webs of the lower rib section 14 in the orientation shown provide extremely great strength to the rib which permits it to withstand the lateral hydrostatic pressure of the water in the pool. The combined tubular and web portions of the upper rib section 15, as described above, also provide extremely high strength to the fence which is supported thereby, as described in detail hereafter.

The rib 10 has been described above as being fabricated from two separate sections. This is desirable from a manufacturing standpoint because of the size of the mold which would be required if it were fabricated as a single unit. It will be appreciated, however, that it can be fabricated as a single unit and that a member such as keying member 63 can be inserted into a tubular portion which is essentially a combination of the tubular portions of the upper and lower sections.

As noted above, the lower portions of ribs 13 are installed in the frame consisting of channels 11. The upper portions of ribs 13 are secured to each other by an upper peripheral rectangular frame 80 consisting of elongated metal frame members 81 (FIG. 11) which are bolted together by bolts 82 at the corners of the pool. Frame members 81 essentially include angles 83 oriented relative to each other as shown in FIGS. 2 and 11 and which are welded to a rod 84 which is of a sawtooth form and extends between opposed sides of the angle members. The frame members 80 rest on horizontal upper tubular portions 32 of ribs 13, and are suitably secured to posts 20, as by nails which extend through holes 83' (FIG. 3A) in angles 83 and which penetrate the tubular portions 19. Thus, the lower frame consisting of channels 11, and the upper frame 80 stabilize the ribs against outward pressure produced by the water within plastic liner 85 which bears against plywood wall panels 86 which are secured to posts 20, as by nailing. In this regard, it is to be understood that the nails penetrate the tubular portion 19 and are received in posts 20.

A facia board 87 (FIGS. 2 and 3) is nailed to the member 63 in each upper rib section 15. The nails 89 extend through the facia board, through the plastic face of tubular portion 46 and are received in the keying member 63. A first wooden beam 90 (FIGS. 2 and 3) is nailed to the tops of posts 20, and a second wooden beam 91 is nailed to the top of the facia board 87. The tops of beams 90 and 91 lie in the same plane and serve as a support for the plurality of interconnected modular solar heating panels or sections 92 which also serve as deck or walkway 93 (FIG. 1) about the periphery of the pool.

Each modular deck panel 92 (FIGS. 15-25) is of blow molded plastic and is preferably about four feet long, but it may be made in any length. Each panel 92 is formed as a plurality of interconnected elongated compartments arranged in serpentine fashion through which pool water is pumped by the pump (not shown) which circulates the pool water, as is well known.

Each panel 92 includes a top wall 93, and a bottom wall 94. The left side of panel 92 (FIG. 15) includes a side wall 95 which connects top and bottom walls 93 and 94. The panel 92 also includes a side wall 96 which connects top wall 93 and bottom wall 94. End wall 97 connects top and bottom walls 93 and 94 and also connects side walls 95 and 96. An end wall 99 connects top wall 93 and bottom wall 94 and also connects side walls 95 and 96.

The modular deck panel 92 is divided into a plurality of interconnected compartments 100, 101, 102, 103, 104, 105, 106 and 107. Compartment 100 is defined by portion 109 (FIG. 17) of top wall 93, portion 110 (FIG. 16) of bottom wall 94, portion 111 (FIG. 18) of side wall 95 and portion 112 (FIG. 18) of side wall 96. It is also defined by wall 113 (FIGS. 15, 16 and 20) which includes wall portion 114 located above web 115, a wall portion 116 which forms a side of slot 117 which extends entirely through the deck panel, and a wall portion 119 which is located above web 120.

Figure 17:
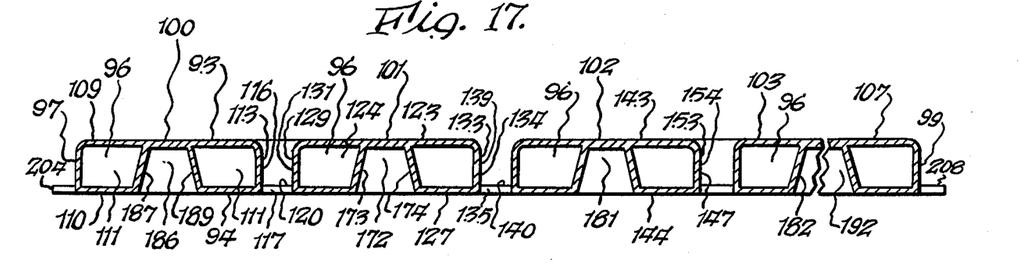
FIG. 17 is a fragmentary enlarged cross sectional view taken substantially along line 17—17 of FIG. 15.

Compartment 100 is in communication with adjacent compartment 101 through a conduit portion 121 (FIGS. 15 and 20) which is bordered by side wall 96, top wall 93, bottom wall 94, and wall 122. Compartment 101 is bounded by portion 123 (FIG. 17) of top wall 93, portion 124 of side wall 96, portion 125 of side wall 95, and portion 127 (FIG. 17) of bottom wall 94. Compartment 101 is also bounded by wall 129 which includes a portion 130 which is the counterpart of wall portion 119 (FIG. 15), a wall portion 131 which is the counterpart of wall portion 116 and wall portion 132 which is the counterpart of wall portion 114 and which overlies web 115. Compartment 101 is also bounded by wall 133 which includes a central portion 134 which forms one side of through-slot 135 and which also includes a portion 136 which overlies web 137 and a portion 139 which overlies web 140. A conduit 141 (FIG. 21), which effects communication between compartments 101 and 102, is bounded by side wall 95, top wall 93, bottom wall 94 and wall 142 at the end of slot 135. Compartment 102 is bounded by portion 143 (FIG. 17) of upper wall 93, portion 144 of lower wall 94, portion 145 (FIG. 23) of side wall 96, and portion 146 (FIG. 22) of side wall 95. It is also bounded by wall 147 (FIGS. 15 and 16) which has a portion 149 overlying web 150, a portion 151 overlying web 152, and a portion 153 which forms a side of through-slot 154 (FIG. 17). A conduit 155, which is the same as conduit 121 effects communication between compartment 102 and 103.

Compartments 103 and 105 are identical in all respects to compartment 101, as described heretofore and as will be described in greater detail hereafter. Compartments 104 and 106 are identical in all respects to compartment 102, as described above and as will be described in greater detail hereafter. Compartment 107 is the mirror image of compartment 100. Compartments 101 and 102 in combination with conduit 141 joining them, define a U-shaped portion of panel 92 with elongated slot 135 therebetween. Compartments 103 and 104 comprise a U-shaped portion of the panel with an elongated slot 156 therebetween, elongated slot 156 being identical to elongated slot 135 in all respects and having webs 157 and 159 at the ends thereof, said webs being identical to webs 137 and 140, respectively. Compartments 105 and 106 also form a U-shaped portion of panel 92 in combination with conduit 160 therebetween, conduit 160 being identical to conduit 141. An elongated slot 161, which is identical to elongated slot 135, is located between compartments 105 and 106. Webs 162 and 163 at the ends of elongated slot 161 are identical to webs 137 and 140, respectively. A conduit 164, which is identical to conduit 141, effects communication between compartments 103 and 104. A conduit 165, which is identical to conduit 121, effects communication between chambers 104 and 105. A conduit 166, which is identical to conduit 121, effects communication between chambers 106 and 107. An elongated slot 167, which is identical to elongated slot 117, is located between chambers 106 and 107. Webs 169 and 170, which are identical to webs 115 and 120, respectively, are positioned at the ends of slot 167. Summarizing, U-shaped portions 101–102 and 103–104 and 105–106 are identical to each other in all respects and end compartments 100 and 107 are mirror image counterparts of each other.

Figure 19:
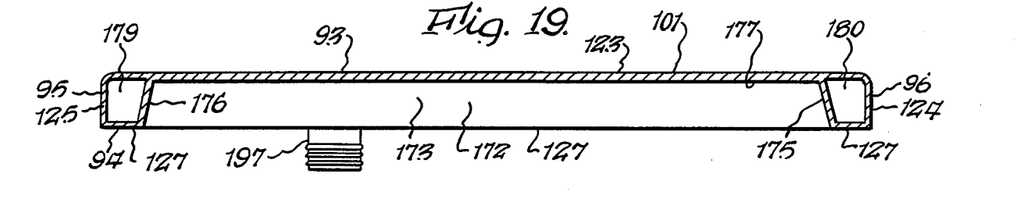
FIG. 19 is a cross sectional view taken substantially along line 19—19 of FIG. 15.
Figure 20:
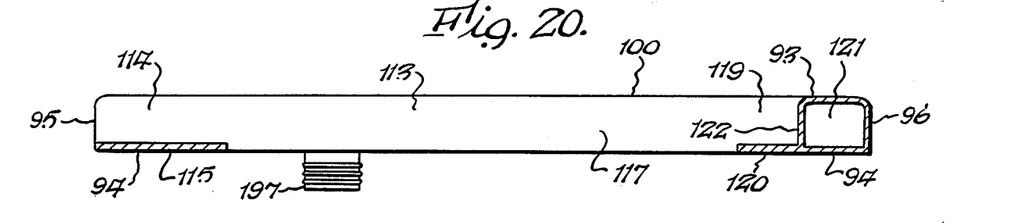
FIG. 20 is a cross sectional view taken substantially along line 20—20 of FIG. 15.
Figure 21:
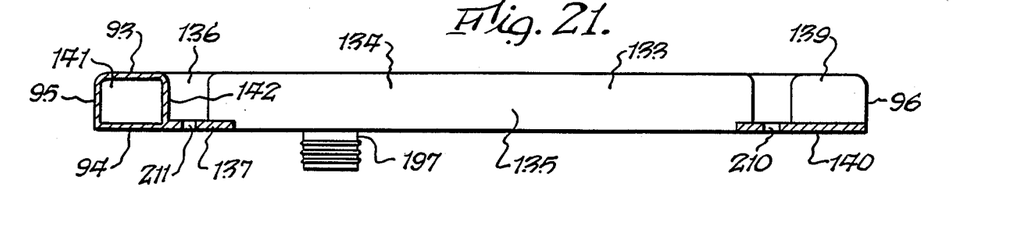
FIG. 21 is a cross sectional view taken substantially along line 21—21 of FIG. 15.
Figure 22:
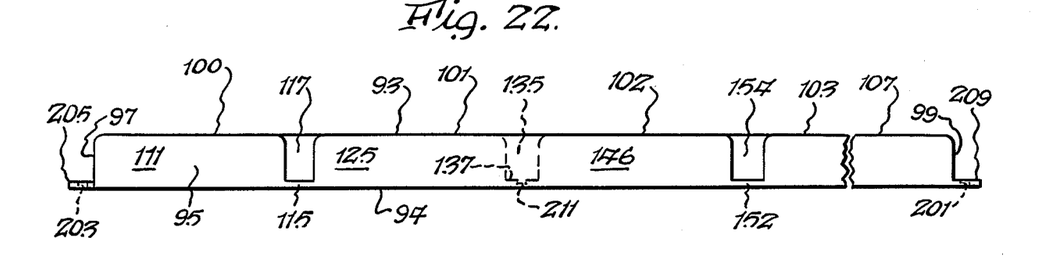
FIG. 22 is a fragmentary side elevational view taken substantially in the direction of arrows 22—22 of FIG. 15.
Figure 23:
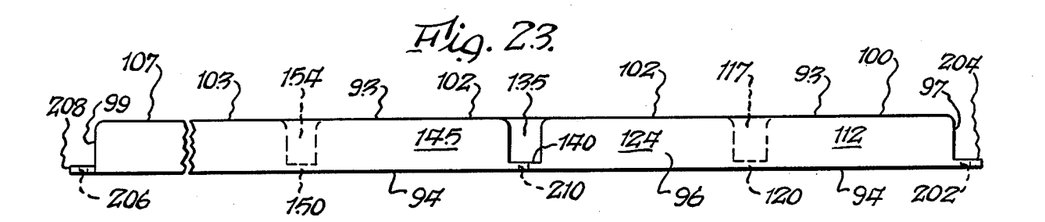
FIG. 23 is a fragmentary side elevational view taken substantially in the direction of arrows 23—23 of FIG. 15.

An elongated depression 172 (FIGS. 16, 17 and 19) of oblong-shape has side walls 173 and 174 and end walls 175 and 176. Walls 173, 174, 175 and 176 merge into the underside 177 of top wall 93. Water passageways 179 and 180 are located at the ends of depression 172 (FIG. 19). The side walls of depression 172 rigidize compartment 101 which form a part of the deck around the edge of the pool. Elongated depressions 181, 182, 183, 184 and 185 are identical in all respects to elongated depression 172 and they serve the same function relative to their respective compartments. Therefore, a detailed description of these elongated depressions is deemed unnecessary.

Compartment 100 (FIGS. 15, 16, 17 and 18) includes a depression 186 having side walls 187 and 189 and end walls 190 and 191. All of the walls extend between bottom wall 94 and top wall 93. Depression 186 serves the same function as depression 172. A depression 192 in compartment 107 is identical in all respects to depression 186 of compartment 100.

Figure 18:
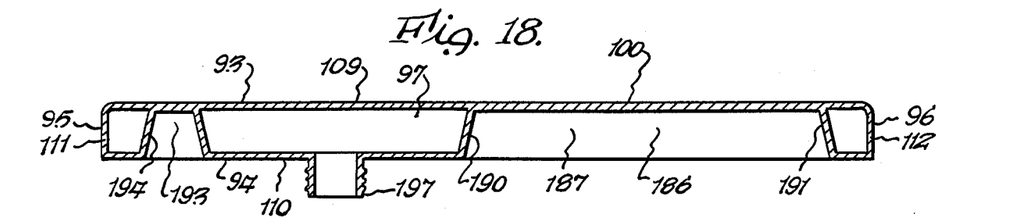
FIG. 18 is a cross sectional view taken substantially along line 18—18 of FIG. 15.

A frustoconical depression 193 in compartment 100 has a side wall 194 which extends between bottom wall 94 and top wall 93 (FIG. 18). A frustoconical depression 195, which is identical to depression 193, is located in compartment 107. The side walls surrounding depressions 193 and 195 provide support to adjacent portions of top wall 93.

A nipple 197 (FIGS. 16 and 18) extends downwardly from bottom wall portion 110 of compartment 100. An identical nipple 199 extends downwardly from the portion of bottom wall 93 associated with compartment 107. Nipples 197 and 199 are coupled to conduits which conduct pool water relative to each solar panel 92 from adjacent like panels 92. More specifically, in FIGS. 24 and 25 nipple 197 is shown associated with compartment 100 of one deck panel 92 and nipple 199 is shown associated with compartment 107 of an adjacent deck panel 92. A U-shaped hose 200 has its ends mounted on nipples 197 and 199 by hose clamps 201. Thus, a plurality of solar deck panels 92 can be placed in end-to-end relationship and pool water can be passed sequentially through them.

Figure 24:
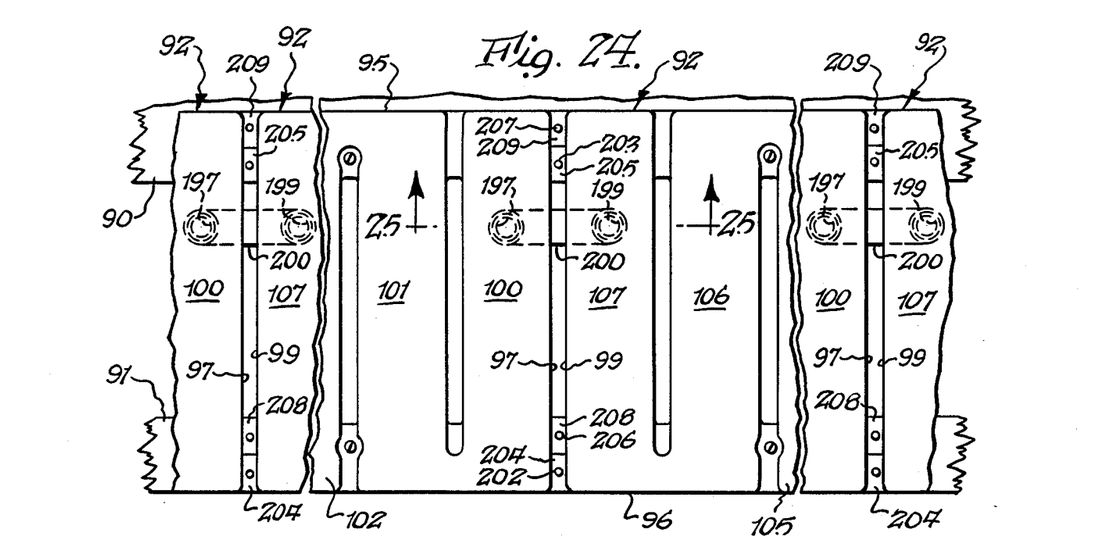
FIG. 24 is a fragmentary plan view taken in the direction of arrows 24—24 of FIG. 25 and showing the ends of adjacent deck panels with hoses therebetween.
Figure 25:
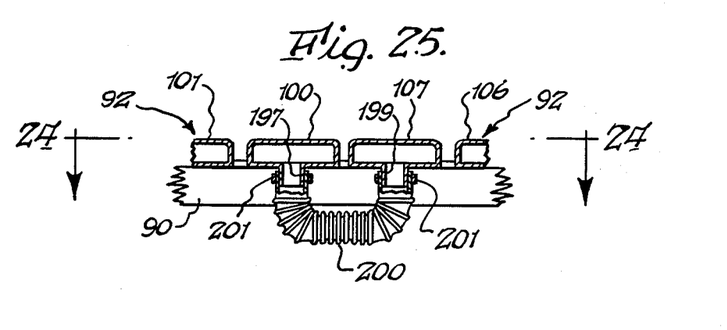
FIG. 25 is a fragmentary cross sectional view taken substantially along line 25—25 of FIG. 24.

Each solar deck panel 92 is attached to beams 90 and 91 by screws. Certain screws pass through apertures 202 and 203 in tabs 204 and 205, respectively, which are formed integrally with the end wall 97 of compartment 100, and other screws pass through apertures 206 and 207 of tabs 208 and 209 which are formed integrally with end wall 99 of compartment 107. In addition, apertures 210 are formed in webs 140, 159 and 163, and apertures 211 are formed in webs 137, 157 and 162. Screws are passed through apertures 210 and 211 to firmly attach each modular deck panel 92 to beams 90 and 91 (FIGS. 3, 24 and 25).

Figure 1:
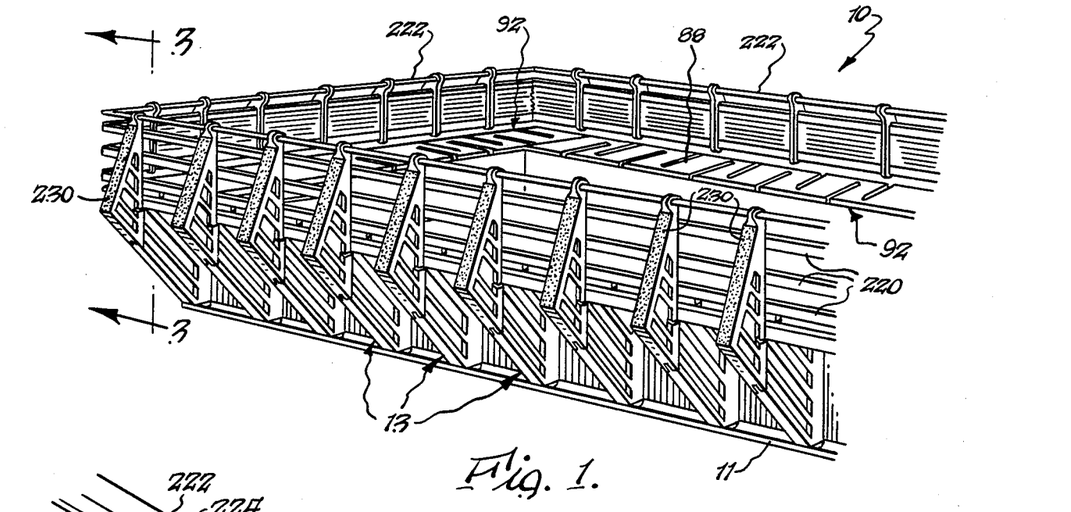
FIG. 1 is a fragmentary perspective view of an above ground swimming pool which includes the improved rib and solar deck construction of the present invention.
Figures 9, 10, 12:
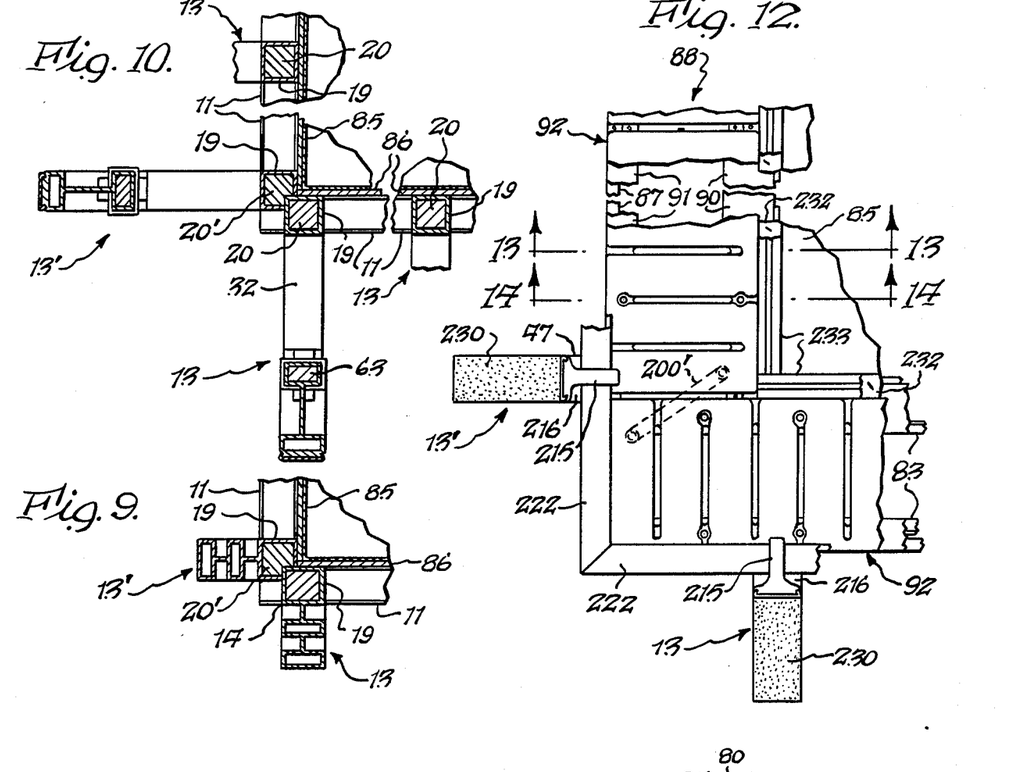
FIG. 9 is a fragmentary cross sectional view taken substantially along line 9—9 of FIG. 3.
FIG. 10 is a fragmentary cross sectional view taken substantially along line 10—10 of FIG. 3.
FIG. 12 is a fragmentary plan view taken substantially in the direction of arrows 12—12 of FIG. 3 and showing a portion of the solar deck and the plastic ribs in plan.

The foregoing description has described the solar deck panels 92 as being placed in end-to-end relationship as shown in FIG. 1. In FIG. 12 the solar deck panels 92 are shown in the manner in which they are installed at the corners of the pool, and they are in liquid communication with each other through a U-shaped conduit 200' which is similar to conduit 200 (FIGS. 24 and 25), but is longer so as to span the distance between the adjacent nipples 197 and 199.

The upper surface of the top wall portion of each compartment 101 through 107 has a tread formed thereon to provide more sure footing. Furthermore, the configuration of the top wall 93 provides a slat-like appearance so that the deck looks like wooden slats parallel to each other. Preferably the color of each panel 92 is brown so that it provides a good sunlight absorbing surface to enhance the solar heating of the water. The through-slots, such as 117, 135, 154 etc. provide spaces between adjacent compartments so that side walls of the compartments bordering the slots are exposed to sunlight, to thereby improve the solar heating capacity by providing more surface area to each compartment than if the panel was unslotted. The walls of the depressions, such as 172 and 186, also provide greater surface area to the compartment so that this feature also improves the solar heating effect, especially since the walls of the depressions 172 and 186 are heated by conductivity because they are in contact with the upper surface 93 of panel 92. In addition, the depressions, such as 172 and 186 trap hot air which rises into the depressions. As the trapped air is cooled, the hotter ambient air will rise into the depressions to perpetuate the heating process. Thus, the elongated through-slots, such as 117, 135, 154 and 156, with their walls serve the multiple functions of (1) enhancing the solar heating of the panels 92, (2) providing a slat-like visual effect, and (3) providing rigidity to the panels. The depressions, such as 172 and 186, also serve the multiple purposes of enhancing heating of the water in each panel 92 and also rigidizing the upper surface 93 so that it can bear the weight of personnel.

Figure 15:
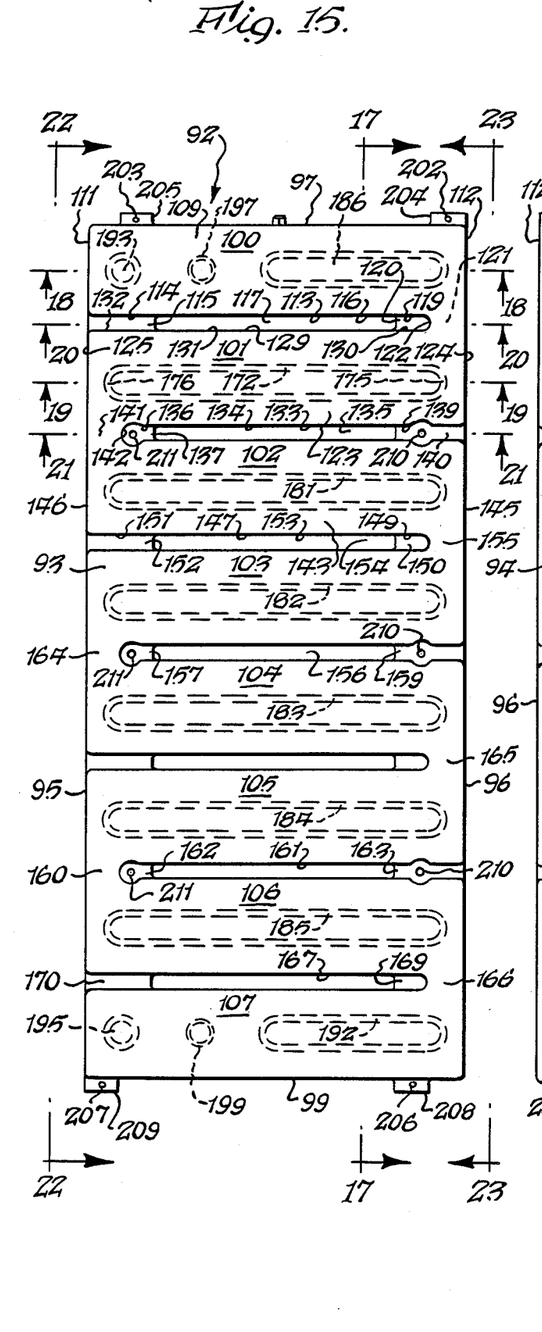
FIG. 15 is a top plan view of a modular solar deck panel.
Figure 16:
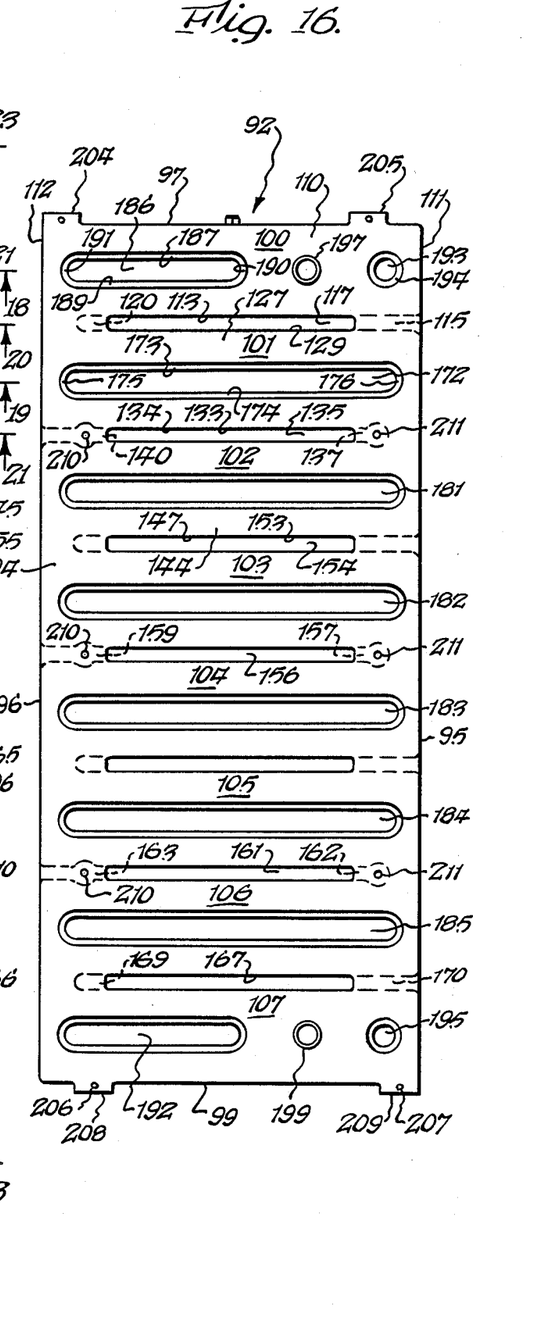
FIG. 16 is a bottom plan view of the solar deck panel.

The walls of the depressions, such as 186 and 172, also serve the additional function of dividing flow through each compartment into two parallel paths Thus, for example, assume that pool water enters nipple 199 in FIG. 15 and exits through nipple 197. The entering water will be divided into two paths about the walls of depression 192. Thereafter, the water will flow through conduit portion 166 joining chambers 107 and 106 and will be divided into two paths on opposite sides of the walls of the depression 185 in chamber 106. The same action occurs in each of the remainder of the compartments until the water exits through nipple 197'. Thus, there is a dual path of water flow through each chamber, and there is a relatively high ratio of wall surface to the cross sectional area of the conduits passing through each chamber, to provide a good heat exchange effect. This can be readily visualized from FIG. 17 wherein it can be seen that the conduits on the opposite sides of the depression walls have a relatively large ratio of surface area to cross sectional area of water flow. As expressed above, this enhances the rate of heat absorption of the panel 92.

The upper rib portion 15 includes a vertical slat-like member 212 (FIGS. 3, 6 and 3C) which has its bottom 213 molded integrally with tubular portion 46 and its top molded integrally at 214 with hollow loop-like member 215 (FIGS. 3 and 7). The opposite end of loop-like portion 215 is molded integrally with the top of tubular portion 47. A shelf 216 (FIGS. 2, 7 and 12) bridges the tops of tubular portions 46 and 47. A space 217 (FIG. 3) is located between slat-like member 212 and the face 219 of tubular member 46. A plurality of parallel wood slats 220 which form a fence are positioned between slat-like members 212 and faces 219 (FIG. 6) of tubular portions 46 and are secured to keying members 63 in tubular members 46 by nails 221, the nails passing through each slat 220 and through the face 219 of each tubular member 46.

A hand rail 222 consists of a wood core 223 having a plastic sheet 224 around it. The hand rail 222 passes through the aligned openings 225 within aligned loop-like members 215 (FIGS. 1, 2, 3 and 7). Nails 226 (FIG. 7) are driven through hand rail 222, passed through shelf 216, and are anchored in the end of keying member 63 (FIG. 7). Thus, the horizontal parallel slats 220 and hand rail 222 coact with the upper rib sections 13 to provide a well integrated stable structure wherein each stabilize the other.

As can be visualized from FIGS. 1, 2 and 3, the intermediate ribs 13, which are not at the corners of the pool, are uniformly spaced from each other to support the side panels 86 (FIG. 3) against which plastic liner 227 bears. The full face 229 (FIG. 2A) of the tubular portion 19 of each intermediate rib 13 bears against the plywood boards 86. However, a special relationship between ribs 13 is provided at the corners of the pool as shown in FIGS. 8, 9, 10 and 11. In this respect, one tubular portion 19 (FIG. 9) and the 4×4 therein has its corner cut away as shown in FIGS. 8, 9 and 10 so as to receive the corner of the adjacent tubular portion 19 in complementary mating relationship.

A plastic cap 230 (FIGS. 1, 3 and 5) of channel-shaped cross sectional configuration has legs 231 extending substantially throughout the length thereof which are received in grooves 232 along the outer edge of tubular portion 47. An abutment 233 is provided at the end of tubular portion 47 and act as a stop for cap 230.

In FIGS. 13 and 14 the relationship is shown between the pool liner 85 and the inner edge of the pool deck 88 consisting of the solar deck panels 92. The upper edge portion 232 of pool liner 85 overlies the upper edge of plywood panels 86 and a portion of the upper side of beam 90. An elongated molding 233 of the cross sectional configuration shown in FIGS. 13 and 14 is nailed to beam 90 with the nails 234 extending through the central portion 235. An elongated plastic cap 236, having barbed legs 237, is snapped into the central portion of molding 233 as shown in FIG. 14 to cover the nails.

It can thus be seen that the improved rib and solar deck construction of the present invention are manifestly capable of achieving the above-enumerated objects, and while preferred embodiments of the present invention have been disclosed, it will be appreciated that it is not limited thereto but may be otherwise embodied within the scope of the following claims.

What is claimed is:

1. A rib for a swimming pool comprising a lower plastic section, a first inner side on said lower plastic section, a first outer side on said lower plastic section, a first central body portion between said first inner and outer sides, an upper plastic section, a second inner side on said upper plastic section, a second outer side on said upper plastic section, a second central body portion between said second inner and outer sides, a first tubular portion at said first inner side for receiving a post, a second tubular portion at said first outer side, a third tubular portion at said second inner side in axial alignment with said second tubular portion, and an elongated keying member having a lower end portion in said second tubular portion and having an upper end portion in said third tubular portion for holding said lower and upper plastic sections in assembled relationship.

2. A rib for a swimming pool as set forth in claim 1 wherein said first and second tubular portions are substantially parallel to each other.

3. A rib for a swimming pool as set forth in claim 1 wherein said first central body portion comprises a plurality of substantially parallel tubular sections extending transversely between said first and second tubular portions, and a plurality of solid webs between said tubular sections.

4. A rib for a swimming pool as set forth in claim 3 wherein said tubular sections are inclined to said first tubular portion and extend upwardly toward said second tubular portion.

5. A rib for a swimming pool as set forth in claim 3 including a substantially horizontal tubular section extending in a direction substantially perpendicularly to said first tubular portion, and a plurality of second tubular sections extending between said first tubular portion and said substantially horizontal tubular section.

6. A rib for a swimming pool as set forth in claim 3 wherein said second central body portion comprises a plurality of second substantially parallel tubular sections extending transversely to said third tubular portion and extending toward said second outer side, and a plurality of second solid webs between said second tubular sections.

7. A rib for a swimming pool as set forth in claim 6 wherein said second outer side comprises a fourth tubular portion, and wherein said second substantially parallel tubular sections and said second solid webs terminate at said fourth tubular portion.

8. A rib for a swimming pool as set forth in claim 7 wherein said second substantially parallel tubular sections are inclined upwardly from said third tubular portion.

9. A rib for a swimming pool as set forth in claim 1 including an elongated slat-like member spaced from said second inner side and located above said lower plastic section and having opposite end portions secured to said second inner side.

10. A rib for a swimming pool as set forth in claim 1 wherein said third tubular portion has a fourth tubular portion at its lower end, first side wall means on said fourth tubular portion, second side wall means on said second tubular portion, and a telescopic fit between said fourth and second tubular portions.

11. A rib for a swimming pool as set forth in claim 10 including first top wall means on said fourth tubular portion, second top wall means on said second tubular portion, said first top wall means resting on said second top wall means when said upper and lower plastic sections are in fully assembled relationship.

12. A rib for a swimming pool as set forth in claim 11 wherein said fourth tubular portion fits over said second tubular portion.

13. A rib for a swimming pool as set forth in claim 10 wherein said first central body portion comprises a plurality of substantially parallel tubular sections extending transversely between said first and second tubular portions, and a plurality of solid webs between said tubular sections.

14. A rib for a swimming pool as set forth in claim 13 including a substantially horizontal tubular section extending in a direction subtantially perpendicularly to said first tubular portion, and certain of said parallel tubular sections terminating at said subtantially horizontal tubular section.

15. A rib for a swimming pool as set forth in claim 14 wherein said second central body portion comprises a plurality of second substantially parallel tubular sections extending transversely to said third tubular portion and extending toward said second outer side, and a plurality of second solid webs between said second tubular sections.

16. A swimming pool assembly comprising a plurality of spaced substantially parallel ribs, each of said ribs comprising a lower plastic section, a first inner side on said lower plastic section, a first outer side on said lower plastic section, a first central body portion between said first inner and outer sides, an upper plastic section, a second inner side on said upper plastic section, a second outer side on said upper plastic section, a second central body portion between said second inner and outer sides, a first tubular portion at said first inner side for receiving a post, a second tubular portion at said first outer side, a third tubular portion at said second inner side in axial alignment with said second tubular portion, an elongated keying member having a lower end portion in said second tubular portion and having an upper end portion in said third tubular portion for holding said lower and upper plastic sections in assembled relationship, fence means positioned proximate said third tubular portions, and nail means extending through said fence means and received in said elongated keying members.

17. A swimming pool assembly as set forth in claim 16 including an elongated slat-like member spaced from each of said third tubular portions and connected thereto, and wherein said fence means comprise a plurality of vertically spaced horizontal slats located between said slat-like members and said third tubular portions.

18. A swimming pool assembly as set forth in claim 16 including a post in each of said first tubular portions, an upper end on each of said posts, first beam means secured to said upper ends of said posts, second beam means secured to each of said elongated keying members, a plurality of solar deck panels each comprising a body, a plurality of elongated compartments on each of said bodies, adjacent side walls on adjacent compartments, conduit means coupling said compartments in series in a serpentine orientation, water inlet and outlet conduit means in each of said bodies for passing water into and out of each of said panels, open spaces between said adjacent compartments to cause the compartments to give the appearance of side-by-side slats when viewed in combination with the spaces therebetween, and securing means on each of said bodies for securing each of said solar deck panels to said first and second beam means.

19. A swimming pool assembly as set forth in claim 18 wherein said securing means comprise tabs on each of said bodies.

20. A swimming pool assembly as set forth in claim 18 wherein said bodies has a longitudinal axis, and wherein each of said open spaces comprise elongated slot-like openings between said side walls, and wherein said elongated compartments are oriented in substantially parallel relationship to each other and substantially perpendicular to said longitudinal axis, and wherein there are unobstructed spaces between adjacent ribs below said elongated slot-like openings, whereby there can be circulation of air between said unobstructed spaces and said elongated slot-like openings.

21. A swimming pool assembly as set forth in claim 20 wherein each of said bodies is fabricated from plastic, and wherein each of said compartments include a top wall and a bottom wall, and wherein each of said bottom walls includes depression means extending toward said top wall, said depression means including side wall means extending toward said top wall for defining said depression means, and said side wall means terminating at each of said top walls to lend support thereto.

22. A plastic solar deck panel for a swimming pool comprising a body having a longitudinal axis, a top wall, a bottom wall spaced from said top wall, body side walls and body end walls, a plurality of elongated adjacent compartments on said body oriented in substantially parallel relationship to each other and in transverse relationship to said longitudinal axis, each of said compartments including a portion of said top wall and a portion of said bottom wall, compartment side walls on certain of said compartments with adjacent compartment side walls of adjacent compartments facing each other, water inlet and outlet means in spaced portions of said body for passing water into and out of said body, conduit means coupling said compartments in series in a serpentine orientation to cause water entering said water inlet means and leaving said water outlet means to pass progressively through said compartments, and elongated slot-like spaces defined by said adjacent side walls of said adjacent compartments and extending downwardly from said top wall toward said bottom wall to cause said compartments to give the appearance of side-by-side slats.

23. A solar deck panel as set forth in claim 22 including securing means on said body for securing said solar deck panel to a swimming pool.

24. A solar deck panel as set forth in claim 23 wherein said securing means comprise tabs on said body.

25. A solar deck panel as set forth in claim 22 wherein said elongated compartments are oriented in substantially perpendicular relationship to said longitudinal axis.

26. A solar deck panel as set forth in claim 22 wherein the portions of said bottom wall which are parts of said compartments include depression means extending toward said top wall, said depression means including side wall means extending toward said top wall for defining said depression means, and said side wall means terminating at said top wall to lend support thereto.

27. A solar deck panel as set forth in claim 26 wherein said side wall means extend lengthwise of the portions of said bottom wall which form parts of each of said compartments to effectively divide each of said compartments into a plurality of compartments.

28. A solar deck panel as set forth in claim 22 including an irregular knurled-like surface on said top wall for both providing a tread and increased surface area for enhancing heat conductivity.

29. A solar deck panel as set forth in claim 64 wherein each of said conduit means is bounded by a portion of said top wall, a portion of said bottom wall, and one of said body side walls.

30. A solar deck panel as set forth in claim 29 including a second end wall at the end of each of said elongated slots which extends between said top wall and said bottom wall, and wherein each of said conduit means is also bounded by said second end wall.

31. A solar deck panel as set forth in claim 30 including web means at the ends of certain of said elongated slots for receiving fasteners for securing said solar deck panel to an underlying structure of a swimming pool.

32. A solar deck panel as set forth in claim 31 wherein said web means are located at opposite ends of said certain of said slots.

33. A solar deck panel as set forth in claim 32 wherein said web means are secured to adjacent compartments.

34. A solar deck panel as set forth in claim 22 including web means at the ends of certain of said slots for attaching adjacent compartments to each other.

35. A solar deck panel as set forth in claim 34 wherein said web means are located at opposite ends of said certain of said slots.

36. A solar deck panel as set forth in claim 35 wherein said web means are located at opposite ends of all of said slots.

37. A solar deck panel as set forth in claim 34 including tab means at said body end walls for securing said solar deck panel to an underlying base of a swimming pool.

38. A solar deck panel as set forth in claim 30 wherein said elongated slots provide completely open spaces entirely through the panel between said top wall and said bottom wall.

39. A solar deck panel as set forth in claim 22 wherein said elongated slots provide completely open spaces entirely through the panel between said top wall and said bottom wall.

40. A plastic pool rib comprising a body, a first inner side on said body, a second inner side on said body spaced laterally from said first inner side, an outer side on said body on the opposite side of said second inner side from said first inner side, a first tubular portion proximate said first inner side, a second tubular portion proximate said second inner side and including a lower tubular portion below said second inner side and axially aligned with said second tubular portion, a plurality of third tubular portions extending transversely between said first tubular portion and said lower tubular portion of said second tubular portion below said second inner side, and web means extending between said third tubular portions.

41. A plastic pool rib as set forth in claim 40 including a fourth tubular portion at said outer side of said body, a plurality of fifth tubular portions extending between said second tubular portion and said fourth tubular portion, and second web means between said fifth tubular portions.

42. A plastic pool rib as set forth in claim 40 including a first elongated wooden member in said first tubular portion.

43. A plastic pool rib as set forth in claim 42 including a second elongated wooden member in said second tubular portion.

44. A plastic pool rib as set forth in claim 40 wherein said first and second tubular portions are substantially vertical, and a fourth tubular portion extending substantially perpendicularly to said first and second tubular portions above said third tubular portions.

45. A plastic pool rib as set forth in claim 44 including fifth tubular portions, second web means extending between said fifth tubular portions, said fifth tubular portions and said second web means extending between said first tubular portion and said fourth tubular portion.

46. A plastic pool rib as set forth in claim 45 including a sixth tubular portion at said outer side of said body, a plurality of seventh tubular portions extending between said second tubular portion and said sixth tubular portion, and third wed means extending between said seventh tubular portions.

47. A plastic pool rib as set forth in claim 46 wherein said web means also extend between said first tubular lower tubular and said portion of said second tubular portion below said second inner side, and wherein said second web means also extend between said first and fourth tubular portions, and wherein said third web means also extend between said second and fourth tubular portions.

48. A plastic pool rib as set forth in claim 47 including a first elongated wooden member in said first tubular portion.

49. A plastic pool rib as set forth in claim 48 including a second elongated wooden member in said second tubular portion.

50. A swimming pool assembly comprising a plurality of spaced substantially parallel ribs, each of said ribs comprising a lower plastic section, a first inner side on said lower plastic section, a first outer side on said lower plastic section, a first central body portion between said first inner and outer sides, an upper plastic section, a second inner side on said upper plastic section, a second outer side on said upper plastic section, a second central body portion between said second inner and outer sides, a first tubular portion at said first inner side for receiving a post, a second tubular portion at said second inner side, a third tubular section at said first outer side in axial alignment with said second tubular portion, an elongated nail-receiving member in said second tubular portion, an elongated slat-like member spaced from said second inner side and located above said lower plastic section and having opposite end portions secured to said second inner side, fence means positioned between said elongated slat-like members and said second tubular portions, and nail means extending through said fence means and received in said elongated nail-receiving members.

51. A plastic pool rib comprising a body, a first vertical side on said body, a second vertical side spaced laterally from and above said first vertical side, a horizontal side connecting said first and second vertical sides, a third vertical side on the opposite side of said second vertical side from said first vertical side, a first tubular portion at said first vertical side, a second tubular portion at said second vertical side, a third tubular portion at said third vertical side, a fourth tubular portion at said horizontal side, a fifth tubular poriton in axial alignment with said second tubular portion and located below said second tubular portion, first tubular means extending transversely between said first and third tubular portions, second tubular means extending transversely between said first and fourth tubular portions, and third tubular means extending transversely between said second and third tubular portions.

52. A plastic pool rib as set forth in claim 51 including first web means extending between said first tubular means, second web means extending between said second tubular means, and third web means extending between said third tubular means.

53. A plastic pool rib as set forth in claim 52 wherein said first web means also extend between said first and third tubular portions, and wherein said second web means also extend between said first and fourth tubular portions, and wherein said third web means also extend between said second and third tubular portions.

54. A plastic pool rib as set forth in claim 51 wherein said second and third tubular means are inclined upwardly from said first tubular portion.

55. A plastic pool rib as set forth in claim 51 wherein said first tubular means are inclined upwardly from said first tubular portion.

56. A plastic pool rib as set forth in claim 51 wherein fifth tubular portion is located between said first and third tubular portions and intersects said first tubular means.

57. A plastic pool rib comprising a body, a first vertical side on said body, a second vertical side spaced laterally from and above said first vertical side, a horizontal side connecting said first and second vertical sides, a third vertical side having a portion on the opposite side of said second vertical side from said first vertical side, a first tubular portion at said first vertical side, a second tubular portion at said second vertical side, a third tubular portion at said third vertical side, a fourth tubular portion at said horizontal side, a fifth tubular portion in axial alignment with said second tubular portion and located below said second tubular portion, first tubular means extending transversely between said first and third tubular portions, and second tubular means located between said second and third tubular portions.

58. A plastic pool rib as set forth in claim 57 including first web means extending between said first tubular means, and second web means extending between said second tubular means.

59. A plastic pool rib as set forth in claim 57 wherein said second tubular portion includes an upper portion, and wherein said first tubular portion includes a lower portion, and wherein said third tubular portion includes a lower portion which extends upwardly from said lower portion of said first tubular portion, and wherein said third tubular portion also includes an upper portion which extends downwardly from said upper portion of said second tubular portion toward said lower portion of said third tubular portion.

60. A plastic pool rib as set forth in claim 57 wherein said second tubular means extend transversely between said second and third tubular portions.

61. A plastic pool rib comprising a body, a first vertical side on said body having an upper portion, a second vertical side spaced laterally from and above said first vertical side and having a lower portion, a horizontal side connecting said upper portion of said first vertical side and said lower portion of said second vertical side, a third vertical side having a portion on the opposite side of said second vertical side from said first vertical side, a first tubular portion at said first vertical side, a second tubular portion at said second vertical side, a third tubular portion at said third vertical side, a fourth tubular portion at said horizontal side, a fifth tubular portion in axial alignment with said second tubular portion and located below said second tubular portion, first tubular means extending transversely between said first and fourth tubular portions, and second tubular means extending between said first and third tubular portions.

62. A plastic solar deck panel for a swimming pool comprising a body, a plurality of elongated adjacent compartments on said body, adjacent side walls on adjacent compartments, conduit means coupling said compartments in series in a serpentine orientation, water inlet and outlet means in said body for passing water into and out of said panel, spaces between said adjacent side walls of said adjacent compartments to cause said compartments to give the appearance of side-by-side slats, a top wall and a bottom wall on each of said compartments, and depression means in each of said compartments, said depression means including side wall means extending from said bottom wall of each of said compartments toward said top wall of each of said compartments for defining said depression means, said side wall means terminating at said top wall to lend support thereto.

63. A plastic solar deck panel as set forth in claim 62 wherein said depression means are elongated and extend lengthwise of each of said compartments to effectively divide each of said compartments into two compartments.

* * * * *

UNITED STATES PATENT AND TRADEMARK OFFICE
CERTIFICATE OF CORRECTION

PATENT NO. : 4,932,085

DATED : June 12, 1990

INVENTOR(S) : Kenneth S. Saj

It is certified that error appears in the above-identified patent and that said Letters Patent is hereby corrected as shown below:

Column 11, line 68 (claim 20), before "said" insert --each of--.

Column 12, line 1 (claim 20), delete "each of".

Column 12, line 67 (claim 29), change "64" to --22--.

Column 14, line 10 (claim 46), change "wed" to --web--.

Column 14, line 14 (claim 47), change "lower tubular and said" to read --and said lower tubular--.

Signed and Sealed this

Eighteenth Day of June, 1991

*Attest:*

HARRY F. MANBECK, JR.

*Attesting Officer*  *Commissioner of Patents and Trademarks*